US012676123B1

(12) United States Patent
Lou et al.

(10) Patent No.: US 12,676,123 B1
(45) Date of Patent: Jul. 7, 2026

(54) MULTIPHASE POWER CONVERTER WITH CURRENT BALANCING

(71) Applicant: TEXAS INSTRUMENTS INCORPORATED, Dallas, TX (US)

(72) Inventors: Jiana Lou, Shanghai (CN); Hao Chen, Ningbo (CN); Zhengyang Wu, Hangzhou (CN); Wenqi Xian, Sichuan (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 19/087,907

(22) Filed: Mar. 24, 2025

(51) Int. Cl.
| | |
|---|---|
| *G09G 3/36* | (2006.01) |
| *G02F 1/13357* | (2006.01) |
| *G09G 3/34* | (2006.01) |
| *H05B 45/325* | (2020.01) |
| *H05B 45/35* | (2020.01) |

(52) U.S. Cl.
CPC ..... *G09G 3/3406* (2013.01); *G02F 1/133603* (2013.01); *G02F 1/133615* (2013.01); *H05B 45/325* (2020.01); *H05B 45/35* (2020.01); *G09G 2310/08* (2013.01); *G09G 2320/064* (2013.01)

(58) Field of Classification Search
CPC ............. G09G 3/3406; G09G 2310/08; G09G 2320/064; H05B 45/35; H05B 45/325; G02F 1/133603; G02F 1/133615

USPC ......................................................... 345/102
See application file for complete search history.

(56) References Cited

U.S. PATENT DOCUMENTS

| | | | | |
|---|---|---|---|---|
| 2014/0306613 A1* | 10/2014 | Shih | ....................... | H05B 45/39 |
| | | | | 315/186 |
| 2021/0243859 A1* | 8/2021 | DeJonge | ................. | H05B 45/14 |
| 2021/0315079 A1* | 10/2021 | Gamperl | .............. | G09G 3/3426 |

* cited by examiner

*Primary Examiner* — Jennifer T Nguyen
(74) *Attorney, Agent, or Firm* — Frank D. Cimino

(57) ABSTRACT

An apparatus includes a voltage control circuit. A first current control circuit has a first current control circuit input coupled to the voltage control circuit's output and has a second current control circuit input. A second current control circuit has a third current control circuit input coupled to the voltage control circuit's output and has a fourth current control circuit input. A current balance circuit has a first current balance circuit output and a second current balance circuit output. The first current balance circuit output couples to the second current control circuit input. The second current balance circuit output couples to the fourth current control circuit input. The current balance circuit generates first and second currents. The first and second currents are based on a difference between a first average current of the first current control circuit and a second average current of the second current control circuit.

20 Claims, 6 Drawing Sheets

MULTIPHASE POWER CONVERTER WITH CURRENT BALANCING

BACKGROUND

Switching power converters (also referred to as switching converters) are used in a variety of applications. For example, one application for the use of switching converters is within a driver to power light emitting diodes (LEDs) as part of a backlight for a display system. Some systems that include switching converters are space-constrained and, accordingly, the space available for integrated circuits and associated passive components is relatively small. In the example of a display system (e.g., automotive or industrial displays), relatively little space apart from the display panel itself is available for the printed circuit board containing the integrated circuits and associated passive components that drive the display and LED backlighting. At least one of the integrated circuits (e.g., an LED driver integrated circuit) for a display system includes a switching converter to provide voltage for the LEDs.

Switching converters include passive components such as inductors and capacitors. Such passive components are external to the LED driver integrated circuit. Mindful of space-constraints, the size of the passive components for the switching converter may be relatively small. The switching frequency of a switching converter is inversely related to the inductance of the switching converter's inductor. A small value of inductance (which may be beneficial to save space because a smaller inductor is needed) results in a switching converter operated with a relatively high switching frequency. A suitable choice of switching converters for high switching frequency operation is an interleaved multiphase switching converter.

SUMMARY

In one example, a display system includes a display panel and a plurality of light emitting diodes (LEDs) arranged with respect to the display panel to illuminate the display panel. A voltage control circuit has an output. A first current control circuit has a first current control circuit input coupled to the output of the voltage control circuit, has a second current control circuit input, and has a first current control circuit output coupled to at least one of the LEDs. A second current control circuit has a third current control circuit input coupled to the output of the voltage control circuit, has a fourth current control circuit input, and has a second current control circuit output coupled to the least one of the LEDs. A current balance circuit has a first current balance circuit output and a second current balance circuit output. The first current balance circuit output is coupled to the second current control circuit input, and the second current balance circuit output is coupled to the fourth current control circuit input. The current balance circuit is configurable to generate a first current at the first current balance circuit output and a second current at the second current balance circuit output. The first and second currents are based on a difference between a first average current of the first current control circuit and a second average current of the second current control circuit.

In another example, an apparatus includes a voltage control circuit. A first current control circuit has a first current control circuit input coupled to the voltage control circuit's output and has a second current control circuit input. A second current control circuit has a third current control circuit input coupled to the voltage control circuit's output and has a fourth current control circuit input. A current balance circuit has a first current balance circuit output and a second current balance circuit output. The first current balance circuit output couples to the second current control circuit input. The second current balance circuit output couples to the fourth current control circuit input. The current balance circuit generates first and second currents. The first and second currents are based on a difference between a first average current of the first current control circuit and a second average current of the second current control circuit.

In yet another example, an apparatus includes a first current control circuit having a first transistor. The first current control circuit has a first clock input, a first error current input, a first current balance input, and a first output. The first current control circuit is configurable to combine a first error current from the first error current input with a first balance current from the first current balance input to produce a first reference current, and to change a state of the first transistor in response to a first current through the first transistor reaching the first reference current. A second current control circuit has a second transistor. The second current control circuit has a second clock input, a second error current input, a second current balance input, and a second output. The second current control circuit is configurable to combine a second error current from the second error current input with a second balance current from the second current balance input to produce a second reference current, and to change a state of the second transistor in response to a second current through the second transistor reaching the second reference current. A current balance circuit has a first input, a second input, a first current output, and a second current output. The first input is coupled to the first output. The second input is coupled to the second output. The first current output is coupled to the first current balance input, and the second current output is coupled to the second current balance input. The current balance circuit is configurable to produce the first balance current at the first current output and the second balance current at the second current output in response to a difference between the first current and the second current.

DETAILED DESCRIPTION

Figure 1:
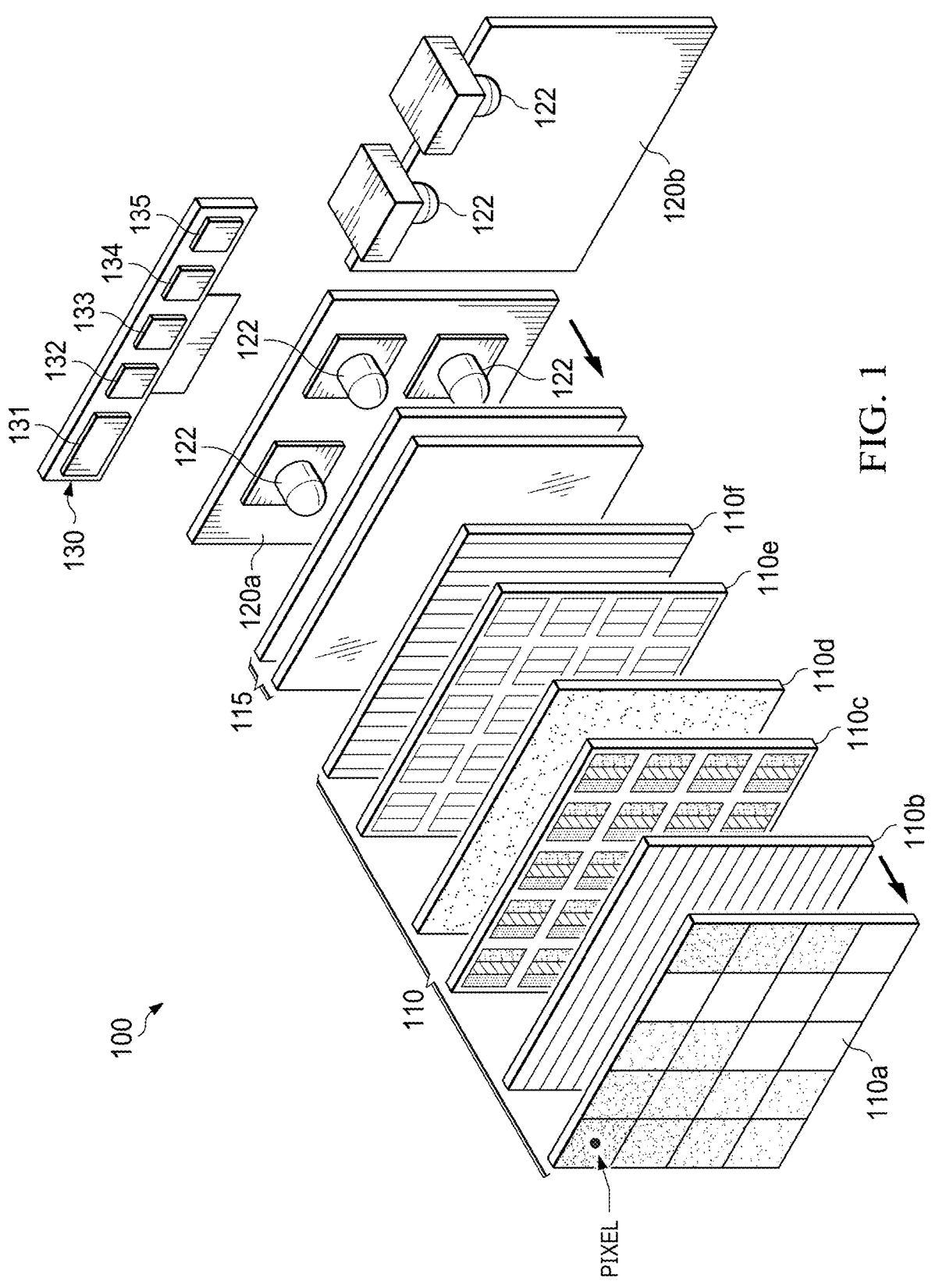
FIG. 1 is a system diagram of a display system, in an example.

The same reference numbers or other reference designators are used in the drawings to designate the same or similar (either by function and/or structure) features.

For proper operation of a multiphase switching converter, power dissipation and thermal performance should be balanced between the phases of the multiphase switching converter. Some multiphase switching converters may be trimmable to account for process variations within the integrated circuit containing the multiphase switching converter. However, trimming cannot account for variations of external components to the integrated circuit, such as external inductors. The examples described herein pertain to a multiphase switching converter which dynamically adjusts the current through each phase such that the average current within each phase is approximately equal.

FIG. 1 is a diagram of an example display system 100. Display system 100 includes a display panel 110, diffusers and lightguides 115, a direct backlight system 120a (or an edge backlight system 120b), and a printed circuit board (PCB) 130. Display panel 110 includes one or more components, for example, a front layer 110a having a contrast coating, a polarizing film 110b, color filters 110c, liquid crystals 110d, a thin film transistor 110e, and a polarizing film 110f. The backlight system 120a (or 120b) includes one or more light emitting diodes (LEDs) 122 arranged with respect to the display panel 110 provide backlighting for the display system. The PCB 130 includes one or more integrated circuits (ICs) such as a timing controller 131, a liquid crystal display (LCD) bias circuit 132, a gamma buffer 133, a level shifter 134, and an LED driver 135. Passive components, such as inductors, resistors, and capacitors also are provided on PCB 130. PCB 130 may be provided along the periphery of the display system, but very little space may be available for the PCB.

LED driver 135 may include a switching converter, e.g. a boost switching converter, to provide a voltage to LEDs 122. In one example, LED driver 135 can control the brightness level of light produced by the LEDs 122 by controlling the average current through the LEDs. In one example, the LED driver 135 responds to a pulse width modulation (PWM) dimming signal (PWM_DIMMING, described below) by turning on the LEDs 122 when the PWM dimming signal is at a first logic state (e.g., logic high) and turning off the LEDs 122 when the PWM dimming signal is at a second logic state (e.g., logic low). The frequency of the PWM dimming signal is faster than the frequency response of the human eye and thus humans do not perceive any flickering. The human eye detects the intensity of the light produced by the blinking LEDs 122 to be a function of the duty cycle of the PWM dimming signal.

As described above, the limited space available for PCB 130 may be such that inductors on the PCB are relatively small thereby having relatively small inductance values. Because of small inductance values, the switching converter on the LED driver 135 may be set to have a relatively high switching frequency. In some examples, the switching converter is a multiphase switching converter, such as a multiphase boost converter, a multiphase buck converter, or a multiphase buck-boost converter. The number of phases of such switching converters is two or more.

Figure 2:
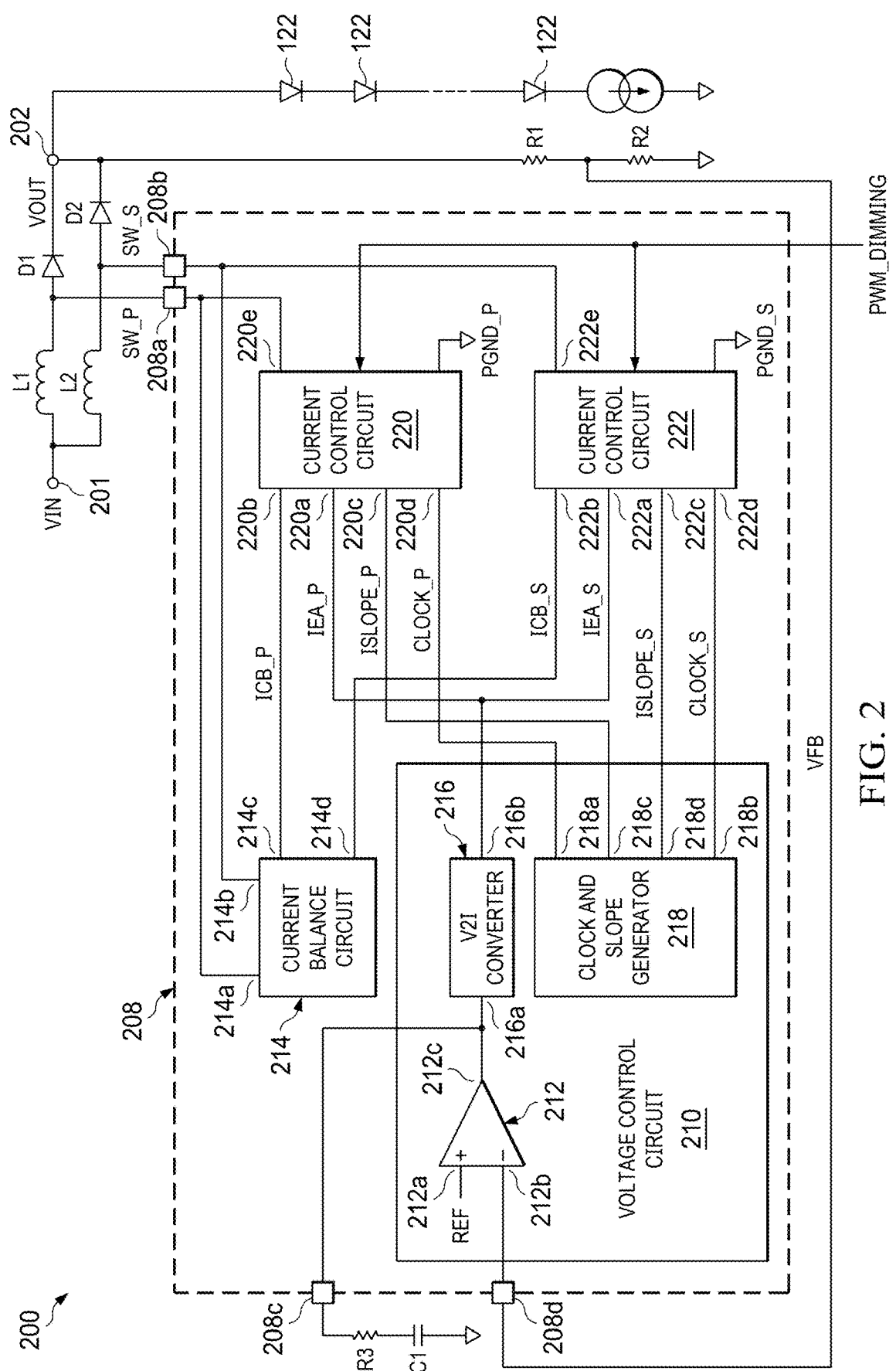
FIG. 2 is a schematic diagram of a multiphase boost converter for driving an LED backlighting in the display system of FIG. 1, in an example.

FIG. 2 is a circuit schematic of a multiphase boost converter 200, which may be usable in LED driver 135 of FIG. 1. Multiphase boost converter 200 includes a voltage control circuit 210, current control circuits 220 and 222, a current balance circuit 214, resistors R1, R2, and R3, capacitor C1, inductors L1 and L2, and diodes D1 and D2. In one example, voltage control circuit 210, current control circuits 220 and 222, and a current balance circuit 214 are provided on an integrated circuit 208, and resistors R1-R3, capacitor C1, inductors L1 and L2, and diodes D1 and D2 are provided external to integrated circuit 208. Integrated circuit 208 and resistors R1-R3, capacitor C1, inductors L1 and L2, and diodes D1 and D2 may be mounted on a printed circuit board or other suitable connection structure. Integrated circuit 208 has externally-accessible terminals such as switching terminals 208a and 208b, a compensation terminal 208c, and a feedback terminal 208d. An input voltage VIN is provided to an input voltage terminal 201 of boost converter 200, and an output voltage VOUT is provided at an output voltage terminal 202 coupled to one or more serially-connected strings of LEDs 122. Resistors R1 and R2 are coupled in series between the output voltage terminal 202 and ground and provide a divided-down feedback voltage VFB.

Voltage control circuit 210 includes an amplifier 212 (e.g., a transconductance amplifier), a voltage-to-current (V2I) converter 216, and a clock and slope generator 218. Amplifier 212 has inputs 212a and 212b and an output 212c. A reference voltage (e.g., from a reference voltage generation circuit) is provided to input 212. Feedback voltage VFB is provided to input 212b through feedback terminal 208d of integrated circuit 208. Amplifier 212 generates an output error signal at its output 212c based on the difference between the reference voltage REF and the feedback voltage VFB. The output 212c of amplifier 212 is coupled to input 216a of V2I converter 216. Resistor R3 and capacitor C1 are coupled in series between compensation terminal 208c and ground. The output 212c of amplifier 212 is coupled to compensation terminal 208c. V2I converter 216 has an output 216b. V2I converter 216 converters the error signal from amplifier 212 to an error current.

In the example of FIG. 2, multiphase boost converter 200 is a two-phase boost converter and, accordingly, has a two current control circuits 220 and 222—one current control circuit for each phase. Current control circuit 220 has inputs 220a, 220b, 220c, and 220d, and an output 220c. Similarly, control circuit 222 has inputs 222a, 222b, 222c, and 222d, and an output 222c. Each current control circuit 220, 222 also receives a PWM_DIMMING signal, described above. Current balance circuit 214 has inputs 214a and 214b and outputs 214c and 214d. Clock and slope generator 218 has outputs 218a, 218b, 218c, and 218d. Inputs 214a and 214b of current balance circuit 214 are coupled to switching terminals SW_P 208 and SW_S 208b, respectively. Outputs 214c and 214d of current balance circuit 214 are coupled to inputs 220b and 222b, respectively, of current control circuits 220 and 222. Output 216b of V2I converter 216 is coupled to inputs 220a and 222a, respectively, of current control circuits 220 and 222. Outputs 218a and 218b of clock and slope generator 218 are coupled to inputs 220d and 222d, respectively, of current control circuits 220 and 222. Outputs 218c and 218d of clock and slope generator 218 are coupled to inputs 220c and 222c, respectively, of current control circuits 220 and 222.

Clock and slope generator 218 generates clock signals (clocks) CLOCKP and CLOCKS at its outputs 218a and 218b for the respective current control circuit 220 and 222. For a two-phase boost converter, as in the example of FIG. 2, CLOCKP and CLOCKS are approximately 180 degrees out-of-phase with respect to each other. Clock and slope generator 218 also generates slope compensation currents ISLOPE_P and ISLOPE_S at its outputs 218c and 218d for the respective current control circuit 220 and 222.

The error current from V2I converter 216 is provided as error currents IEA_P and IEA_S to inputs 220a and 222a, respectively, of current control circuits 220 and 222. As described below, current balance circuit 214 generates current balance currents ICB_P and ICB_S for current control circuits 220 and 222 to help equalize the average currents through the current control circuits. Integrated circuit 208 has switching terminals SW_P 210a and SW_S 210b, which are externally-accessible terminals of the integrated circuit. The output 220e of current control circuit 220 is coupled to switching terminal SW_P 208a, and output 222e of current control circuit 222 is coupled to switching terminal SW_S 208b. One terminal of inductor L1 is coupled to the input voltage terminal 201, and the other terminal of inductor L1 is coupled to the anode of diode D1 and to switching terminal SW_P 208a. One terminal of inductor L2 also is coupled to the input voltage terminal 201, and the other terminal of inductor L2 is coupled to the anode of diode D2 and to switching terminal SW_S 208b. The cathodes of diodes D1 and D2 are coupled together and to the output voltage terminal 202.

Current control circuits 220 and 222 include a transistor (shown in FIG. 6, described below) that is turned on and off to regulate the current to the load (e.g., LEDs 122). In one example, the transistors of current control circuits 220 and 222 are turned on in accordance with the respective clock CLOCK_P/CLOCK_S. For example, a rising edge of clock CLOCK_P causes the transistor in current control circuit 220 to turn on, and a rising edge of clock CLOCK_S causes the transistor in current control circuit 222 to turn on. In this example, multiphase boost converter 200 is a peak current mode control boost converter. Each current control circuit 220, 222 includes a circuit (e.g., a comparator) to detect when the current through the respective transistor reaches a peak reference current. When the transistor's current reaches the peak reference current, the current control circuit 220, 222 turns the transistor off. Accordingly, the transistor of each current control circuit 220, 222 turns on in response to a clock CLOCK_P/CLOCK_S and turns off in response to the current through the transistor reaching the peak reference current.

Each current control circuit 220,222 generates its peak reference current at least in part based on the charge balance current (ICB_P/ICB_S), error current (IEA_P/IEA_S) and slope compensation current (ISLOPE_P/ISLOPE_S). The charge balance circuit 214 senses the currents through the transistors of the current control circuits 220 and 222 and determines the average of such currents. Based on a difference between the average currents of the current control circuits 220, 222, the charge balance circuit 214 generates charge balance currents ICB_P and ICB_S to iteratively adjust the peak reference current of current control circuits 220, 222 to thereby force the average transistor currents to be approximately equal.

Figure 3:
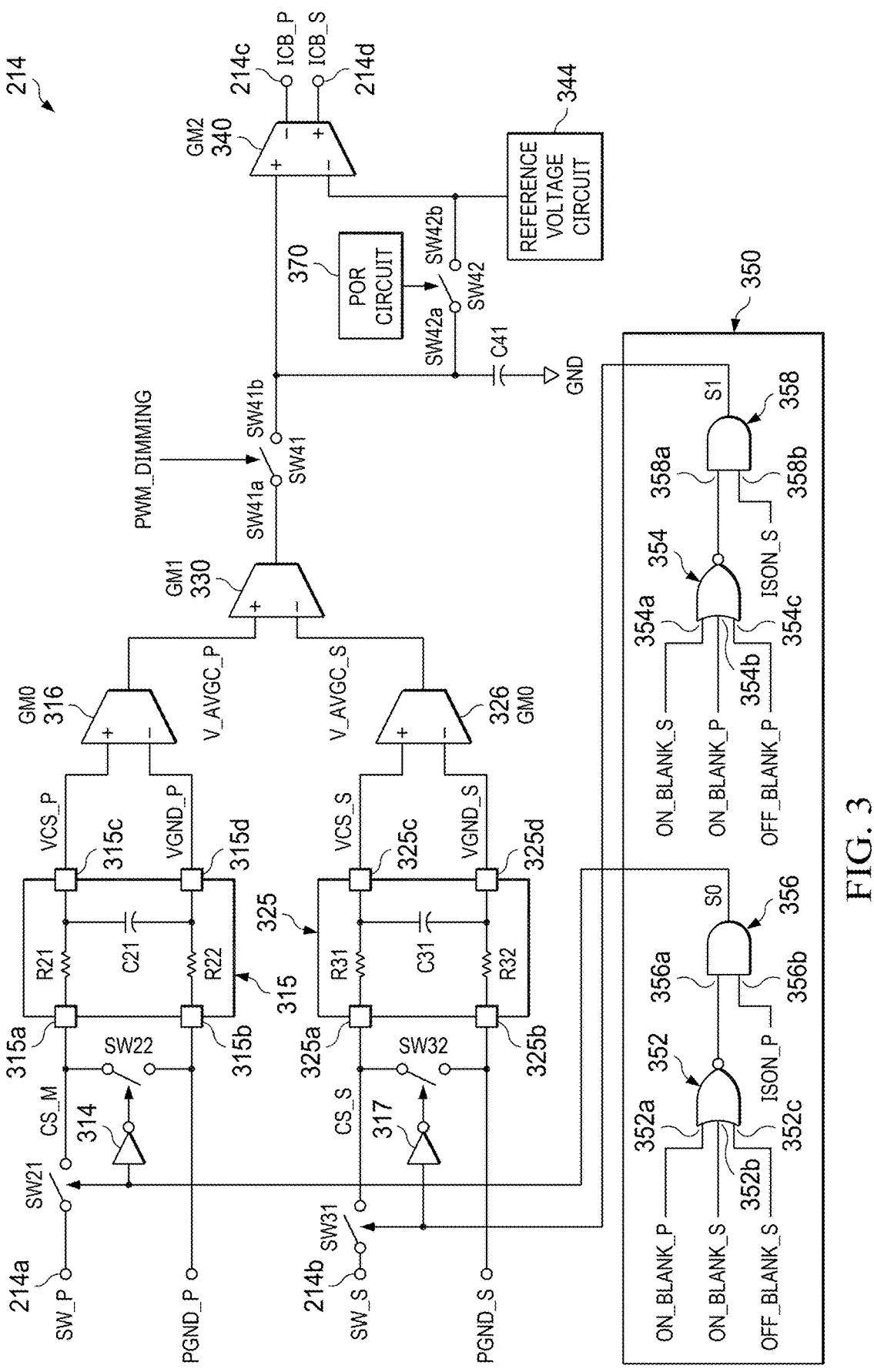
FIG. 3 is a schematic diagram of a current balance circuit within the multiphase boost converter of FIG. 2, in an example.

FIG. 3 is a schematic diagram of an example charge balance circuit 214. In this example, charge balance circuit 214 includes inverters 314 and 317, filters 315 and 325, amplifiers 316, 326, 330, and 340, a reference voltage circuit 344, a logic circuit 350, and a power-on reset (POR) circuit 370, and switches SW22, SW32, SW41, and SW42 (e.g., transistors). In the example of FIG. 3, amplifies 316, 326, 330, and 340 are transconductance amplifiers.

Input 214a is coupled to one terminal of switch SW21, and the other terminal of switch SW21 is coupled to a terminal 315a of filter 315. The ground reference, PGND_P, for current control circuit 220 is coupled to a terminal 315b of filter 315. The voltage difference between input 214a (SW_P) and PGND_P represents the current through the transistor of current control circuit 220. Opposing terminals of switch SW22 are coupled to terminals 315a and 315b, respectively. Filter 315 includes resistors R21 and R22 and a capacitor C21 which form a passive low-pass filter. Opposing terminals of resistor R21 are coupled to terminals 315a and 315c of filter 315. Similarly, opposing terminals of resistor R22 are coupled to terminals 315b and 315d of filter 315. Opposing terminals of capacitor C21 are coupled to terminals 315c and 315d, respectively. The terminals 315c and 315d of filter 315 are coupled to the positive (+) and negative (–) inputs, respectively, of amplifier 330.

Input 214b is coupled to one terminal of switch SW31, and the other terminal of switch SW31 is coupled to a terminal 325a of filter 325. The ground reference, PGND_S, for current control circuit 222 is coupled to a terminal 325b of filter 325. The voltage difference between input 214b (SW_S) and PGND_S represents (e.g., is proportional to) the current through the transistor of current control circuit 222. Opposing terminals of switch SW32 are coupled to terminals 325a and 325b, respectively. Filter 325 includes resistors R31 and R32 and a capacitor C31 thereby forming a passive low-pass filter. Opposing terminals of resistor R31 are coupled to terminals 325a and 325c of filter 325. Similarly, opposing terminals of resistor R32 are coupled to terminals 325b and 325d of filter 325. Opposing terminals of capacitor C31 are coupled to terminals 325c and 325d, respectively. The terminals 325c and 325d of filter 325 are coupled to the positive and negative inputs, respectively, of amplifier 326.

The output of amplifier 330 is coupled to a terminal SW41a of switch SW41, and the other terminal SW41b of switch SW41 is coupled to the positive input of amplifier 340, a terminal of capacitor C41, and terminal SW42a of switch SW42. The other terminal of capacitor C41 is coupled to ground. Terminal SW42b of switch SW42 is coupled to the negative input of amplifier 340 and to an output of reference voltage circuit 344. The reference voltage circuit 344 generates a reference voltage REF at its output for the negative input of amplifier 340. When switch SW42 is closed, capacitor C41 charges to the level of reference voltage REF. POR circuit 370, which may include a one-shot circuit, closes switch SW42 at a power-on reset event for a short period of time (e.g., one microsecond) initially charge capacitor C41 to the reference voltage to help ensure a valid start-up condition for the multiphase boost converter. For the rest of the run-time of multiphase boost converter 200, switch SW42 is open. Amplifier 340 has a negative output and a positive output. The negative output is coupled to output 214c and provides current ICB_P. The positive output is coupled to output 214d and provides current ICB_S.

Logic circuit 350 includes output signals S0 and S1 that control the on/off state of switches SW21, SW22, SW31, and SW32. Signal S0 controls the on/off state of switch SW21 and, through inverter 314, the on/off state of switch SW22. Signal S1 controls the on/off state of switch SW31 and, through inverter 317, the on/off state of switch SW32. Filter 315 is enabled when signal S0 is at a first logic state (e.g., logic high) such that switch SW21 is closed (on) and switch SW22 is open (off). Filter 315 is disabled when signal S0 is at a second logic state (e.g., logic low) such that switch SW21 is open (off) and switch SW22 is closed (on). Filter 325 is enabled when signal S1 is at the first logic state (e.g., logic high) such that switch SW31 is closed (on) and switch SW32 is open (off). Filter 325 is disabled when signal S1 is at the second logic state (e.g., logic low) such that switch SW31 is open (off) and switch SW32 is closed (on).

When filter 315 is enabled, filter 315 low-pass filters its input signal SW_P-PGND_P at its an output signal as VCS_P-VGND_P. Because of the low-pass operation of filter 315, output signal VCS_P-VGND_P represents an average of the current through the transistor of current control circuit 220. When filter 325 is enabled, filter 325 low-pass filters its input signal SW_S-PGND_S at its an output signal as VCS_S-VGND_S. Because of the low-pass operation of filter 325, output signal VCS_S-VGND_S represents an average of the current through the transistor of current control circuit 222.

Amplifier 316 amplifies the difference between VCS_P and VGND_P as a single-ended signal V_AVGC_P. Amplifier 326 amplifies the difference between VCS_S and VGND_S as a single-ended signal V_AVGC_S. Amplifier 330 amplifies the difference between V_AVGC_P and V_AVGC_S. The difference between AVGC_P and V_AVGC_S represents an error signal indicative of the difference in the average current through current control circuits 220 and 222.

PWM_DIMMING controls the open/closed state of switch SW41. When switch SW41 is closed, the error signal from amplifier 330 is provided to the positive input of amplifier 330. Amplifier 330 amplifies the difference between the error signal form amplifier 330 and the reference voltage from reference voltage circuit 344. As the error signal becomes more positive than the reference voltage, current ICB_S increases and current ICB_P decreases from amplifier 340. As the error signal becomes more negative than the reference voltage, current ICB_P increases and current ICB_S decreases from amplifier 340. Currents ICB_P and ICB_S control the peak current references of current control circuits 220 and 222, as described below.

With switch SW42 open, capacitor C41 is charged to the error signal from amplifier 330 while switch SW41 is closed. The voltage across capacitor C41 can then be used for the positive input of amplifier 340 when PWM_DIMMING is logic low and switch SW41 is open. By maintaining the voltage to the positive input of amplifier 340 at the level of the error signal when PWM_DIMMING became logic low, the multiphase boost converter 200 is able to re-establish regulation faster than if capacitor C41 was not present.

Following the transistor within current control circuit 220 turning on and off, voltage ringing may occur on the corresponding switching terminals 208a. Such a small period of time is a function of, for example, the rate of increase of current through the transistor. Similarly, following the transistor within current control circuit 222 turning on and off, voltage ringing may occur on the corresponding switching terminals 208b. During switching terminal ringing, an attempt to sense the current through the corresponding transistor may be inaccurate. Accordingly, logic circuit 350 implements blanking periods during such ringing time periods during which one or the other of filters 315 and 325 is disabled.

Figure 6:
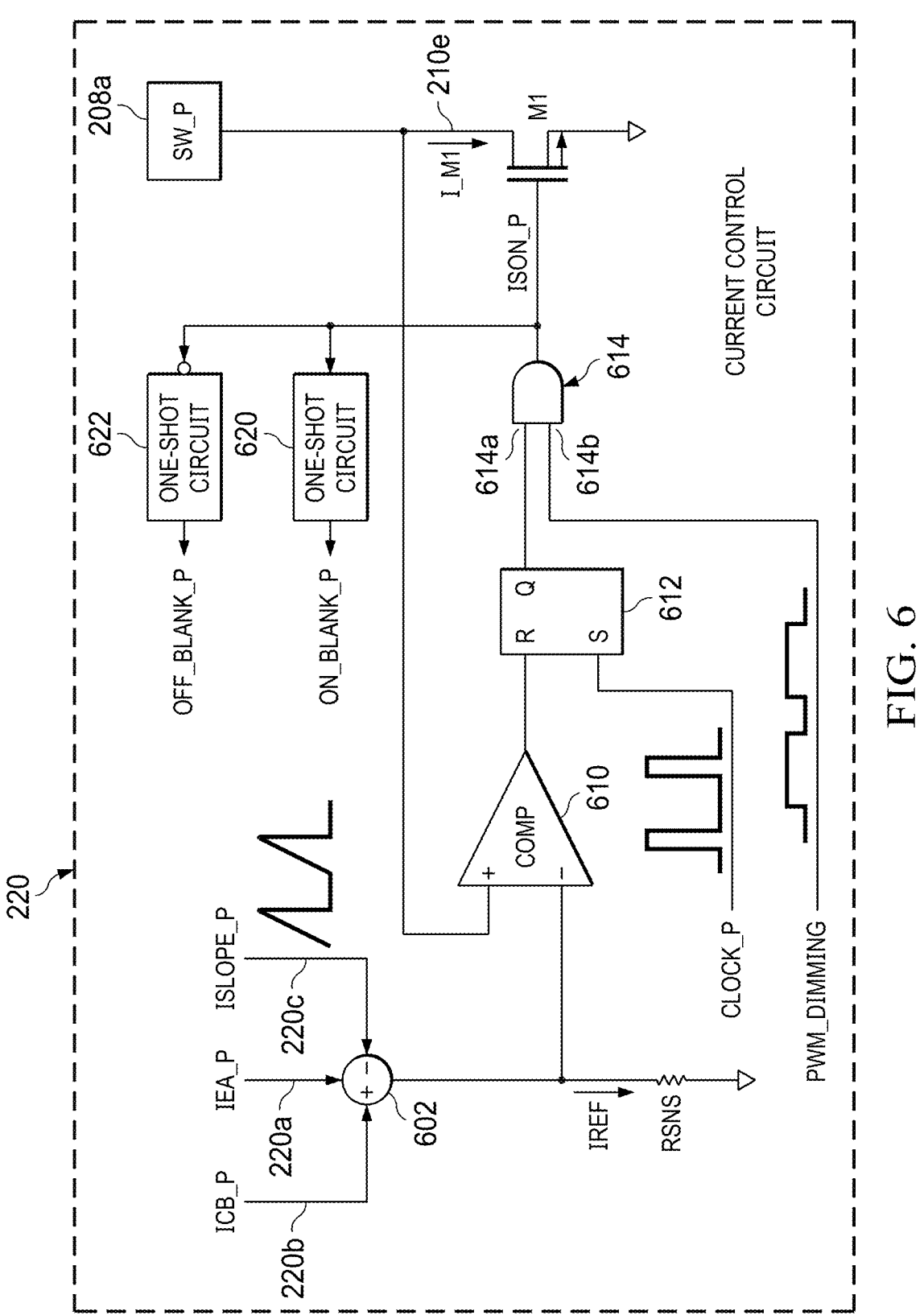
FIG. 6 is a schematic diagram of a current control circuit within the multiphase boost converter of FIG. 2, in an example.

In this example, logic circuit 350 includes NOR gates 352 and 354 and AND gates 356 and 358. NOR gate 352 has inputs 352a, 352b, and 352c. Input 352a receives a signal ON_BLANK_P. Input 352b receives a signal ON_BLANK_S. Input 352c receives a signal OFF_BLANK_S. FIG. 6, described below, provides an example of how signals ON_BLANK_P, ON_BLANK_S, and OFF_BLANK_S are generated. Signal ON_BLANK_P is a pulse (e.g., positive pulse) that begins responsive to the transistor in current control circuit 220 turning on and persists for a long enough period of time (a blanking period) to approximately equal the time during which ringing would occur on switching terminal 208a. Signal ON_BLANK_S is a pulse that that begins responsive to the transistor in current control circuit 222 turning on and persists for a blanking period that approximately equals the time during which ringing would occur on switching terminal 208b. Signal OFF_BLANK_S is a pulse that that begins responsive to the transistor in current control circuit 222 turning off and persists for a blanking period that approximately equals the time during which ringing would occur on switching terminal 208b. Accordingly, the output signal from NOR gate 352 is logic high only when none of signals ON_BLANK_P, ON_BLANK_S, and OFF_BLANK_S are logic high. In other words, the output signal from NOR gate 352 is logic high when none of the blanking periods are occurring when the transistor in current control circuit 220 turns on nor when the transistor in current control circuit 222 turns on or off.

NOR gate 354 has inputs 354a, 354b, and 354c. Input 354a receives a signal ON_BLANK_S. Input 354b receives a signal ON_BLANK_P. Input 354c receives a signal OFF_BLANK_P. Signal ON_BLANK_S is a pulse that begins responsive to the transistor in current control circuit 222 turning on and persists for a blanking period of time approximately equal to the time during which ringing would occur on switching terminal 208b. Signal ON_BLANK_P is a pulse that that begins responsive to the transistor in current control circuit 220 turning on and persists for a blanking period that approximately equals the time during which ringing would occur on switching terminal 208a. Signal OFF_BLANK_P is a pulse that that begins responsive to the transistor in current control circuit 220 turning off and persists for a blanking period that approximately equals the time during which ringing would occur on switching terminal 208a. Accordingly, the output signal from NOR gate 354 is logic high only when none of signals ON_BLANK_S, ON_BLANK_P, and OFF_BLANK_P are logic high. In other words, the output signal from NOR gate 354 is logic high when none of the blanking periods are occurring for when the transistor in current control circuit 222 turns on nor when the transistor in current control circuit 220 turns on or off.

AND gate 356 has inputs 356a and 356b. Input 356a is coupled to the output of NOR gate 352. Input 356b receives a signal ISON_P which, as described below with regards to FIG. 6, is a signal that controls the on and off state of the transistor in current control circuit 220. In one example, signal ISON_P being logic high causes the transistor to turn on and signal ISON_P being logic low causes the transistor to be off. AND gate 356 logically ANDs the output signal from NOR 352 and signal ISON_P as signal S0 to thereby enable filter 315 when the transistor in current control circuit 220 is on and none of the aforementioned blanking periods associated with NOR gate 352 are occurring.

AND gate 358 has inputs 358a and 358b. Input 358a is coupled to the output of NOR gate 354. Input 358b receives a signal ISON_S which, as described below with regards to FIG. 6, is a signal that controls the on and off state of the transistor in current control circuit 222. In one example, signal ISON_S being logic high causes the transistor to turn on and signal ISON_S being logic low causes the transistor to be off. AND gate 358 logically ANDs the output signal from NOR 354 and signal ISON_S as signal S1 to thereby enable filter 325 when the transistor in current control circuit 222 is on and none of the aforementioned blanking associated with NOR gate 354 periods are occurring.

Figure 4:
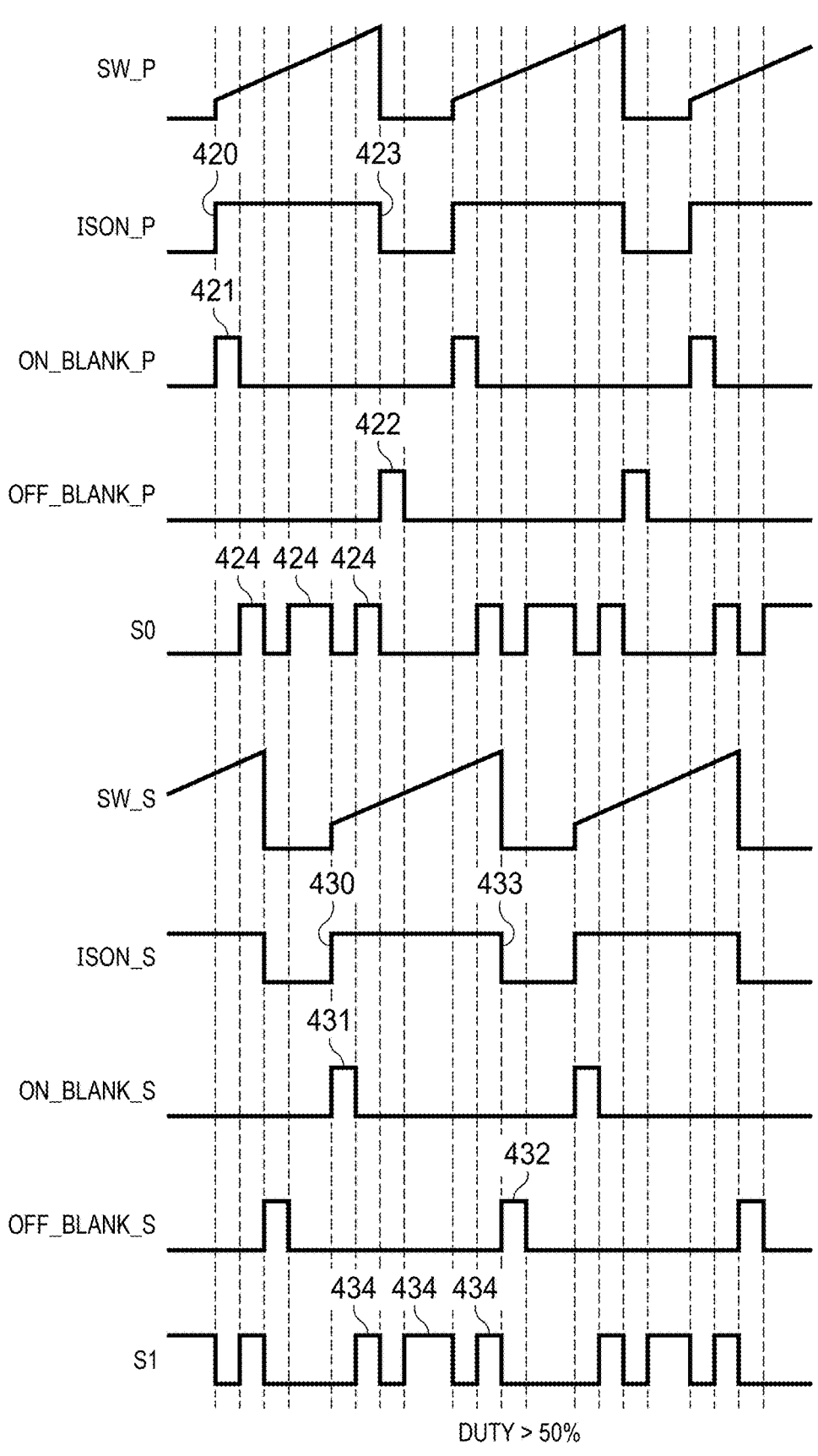
FIG. 4 are waveforms illustrating the operation of the current balance circuit for a duty cycle greater than 50%, in an example.

FIG. 4 is a timing diagram illustrating an example of the operation of current balance circuit 214 for a duty cycle greater than 50% for multiphase boost converter 200. The signals shown in the example of FIG. 4 include SW_P, ISON_P, ON_BLANK_P, OFF_BLANK_P, S0, SW_S, ISON_S, ON_BLANK_S, OFF_BLANK_S, and S1. Signals SW_P and SW_S represent the voltage on switching terminals 208a and 208b when the respective transistor within current control circuits 220 and 222 is on. Because the duty cycle in this example is greater than 50%, signals ISON_P and ISON_S overlap to some degree (e.g., both are logic high during portions of each switching cycle). Signals ON_BLANK_P and OFF_BLANK_P pulse high (e.g., pulses 421 and 422) for a short period of time during blanking periods following respective rising and falling edges 420 and 423 of signal ISON_P. Signals ON_BLANK_S and OFF_BLANK_S also pulse high (e.g., pulses 431 and 432) for a short period of time during blanking periods following respective rising and falling edges of signal ISON_S.

Signal S0 is logic high at 424 when signal ISON_P is logic high and none of the blanking periods defined by pulses on signals ON_BLANK_P, ON_BLANK_S, and OFF_BLANK_S is occurring. Similarly, signal S1 is logic high at 434 when signal ISON_P is logic high and none of the blanking periods defined by pulses on signals ON_BLANK_P, ON_BLANK_S, and OFF_BLANK_S is occurring.

Figure 5:
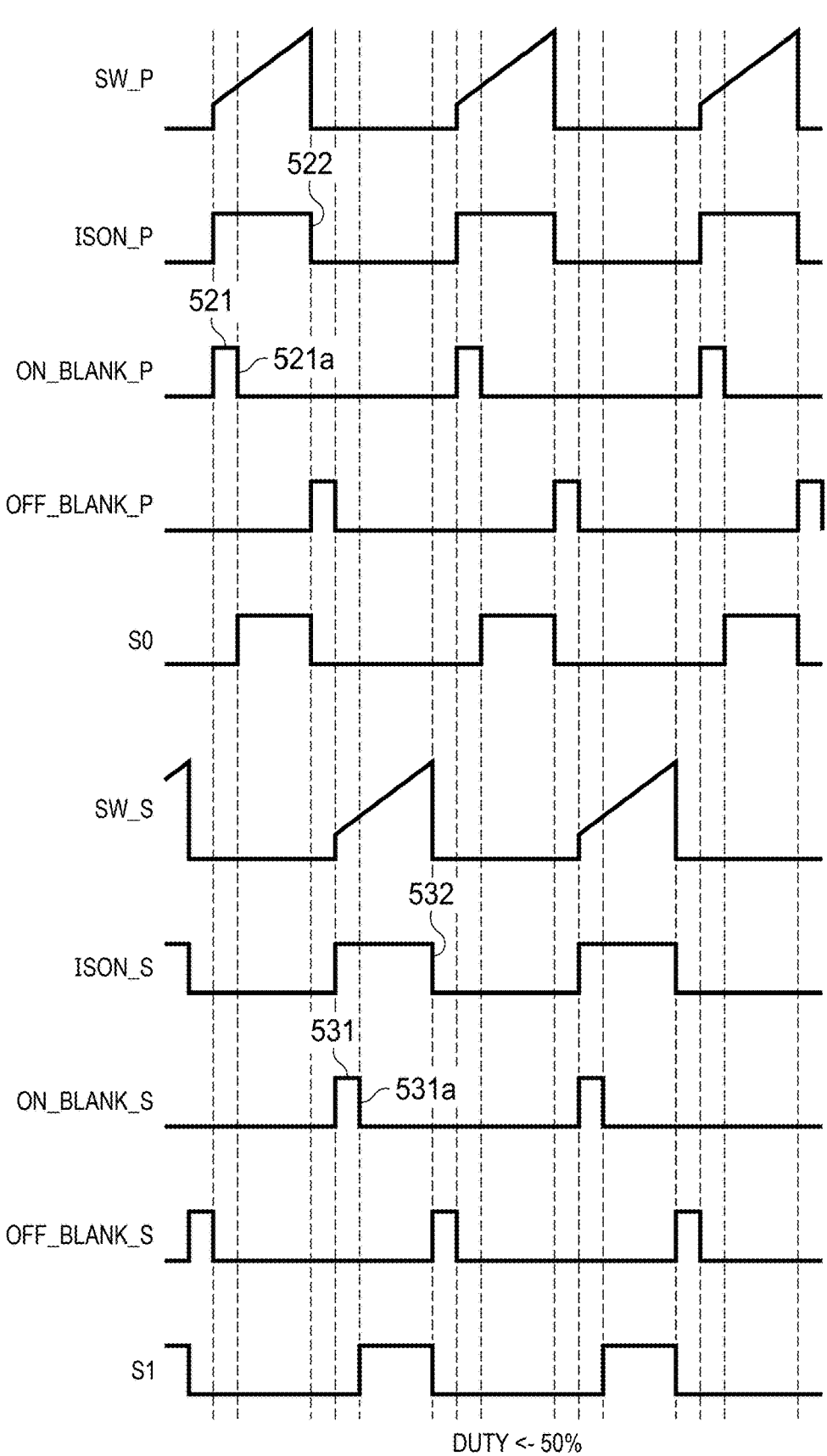
FIG. 5 are waveforms illustrating the operation of the current balance circuit for a duty cycle less than 50%, in an example.

FIG. 5 is a timing diagram illustrating an example of the operation of current balance circuit 214 for a duty cycle less than 50% for multiphase boost converter 200. The same signals are shown in the example of FIG. 5. Signals ISON_P and ISON_S do not overlap for a duty cycle less than 50%. Accordingly, only one blanking period, pulse 521 of signal ON_BLANK_P, occurs when signal ISON_P is logic high. Accordingly, signal S0 becomes logic high in response to the falling edge 521a of pulse 521 and remains logic high until the subsequent falling edge 522 of signal ISON_P. Similarly, only one blanking period, pulse 531 of signal ON_BLANK_S, occurs when signal ISON_S is logic high. Accordingly, signal S1 becomes logic high in response to the falling edge 531a of pulse 531 and remains logic high until the subsequent falling edge 532 of signal ISON_P.

FIG. 6 is a circuit schematic of an example of current control circuit 220. Current control circuit 222 may be implemented as a similar circuit. Current control circuit 220 includes a current summer 602, a resistor RSNS, a comparator 610, set(S)-reset (R) flip-flop 612, an AND gate 614, one-shot circuit 620 and 622, and transistor M1. Transistor M1 (e.g., an n-channel field effect transistor) is the transistor mentioned above with respect to current control circuit 220. The drain of transistor M1 is coupled to switching terminal 208a and the source is coupled to ground. Currents ICB_P, IEA_P, and ISLOPE_P sum together at current summer 602, and the summed current IREF then flows through resistor RSNS. The voltage across resistor RSNS is proportional to the sum of currents ICB_P, IEA_P, and ISLOPE_P. One terminal of resistor RSNS is coupled to the negative input of comparator 610. Switching terminal 208a is coupled to the positive input of comparator 610. SR flip-flop has an R input, an S input and Q output. The output of comparator 610 is coupled to the R input. CLOCK_P is provided to the S input. When the signal from comparator 610 is logic high, SR flip-flop 612 resets and its Q output becomes logic low. When CLOCK_P is logic high, SR flip-flop 612 is set and its Q output becomes logic high. AND gate 614 has an input 614a coupled to the Q output of SR flip-flop 612 and an input 614b that receives the PWM_DIMMING signal. When both the PWM_DIMMING signal and the Q output are logic high, AND gate generates its output signal, ISON_P, to a logic high state to thereby turn on transistor M1. While PWM_DIMMING is logic high, transistor M1 is repeatedly turned on and off during each switching cycle of the multiphase boost converter 200. In response to a rising edge of CLOCK_P, SR flip-flop is set and signal ISON_P becomes logic high thereby turning on transistor M1. With transistor M1 on, the current I_M1 through transistor M1 increases. Eventually, current I_M1 reaches the level of IREF, at which time comparator 610 forces its output to a logic high state thereby resetting SR flip-flop 612. In response to SR flip-flop being reset, the output signal ISON_P from AND gate 614 becomes logic low, which causes transistor M1 to turn off. The process repeats while PWM_DIMMING is logic high. When PWM_DIMMMING is logic low, transistor M1 is off.

Current IREF is proportional, in part, to current ICB_P. Current IREF represents the peak current reference for current control circuit 220. By adjusting the current IREF in current control circuit 220 and the corresponding current IREF in current control circuit 222, the peak current references of the phases are iteratively adjusted to advantageously maintain the average current through transistor M1 in current control circuit 220 approximately equal to the average current through the corresponding transistor of current control circuit 222.

One-shot circuit 620 has input coupled to the output of AND gate 614. Similarly, one-shot circuit 622 has an input coupled to the output of AND gate 614. The input of one-shot circuit 622 is inverted with respect to the input of one-shot circuit 620. One-shot circuit 620 generates a pulse as ON_BLANK_P in response to a rising edge of ISON_P. One-shot circuit 622 generates a pulse as OFF_BLANK_P in response to a falling edge of ISON_P. The duration of the one-shot pulses is set to be long enough to approximately equal the length of time for ringing on the corresponding switching terminal, as described above.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Any switch described herein may be implemented as a transistor. Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device.

For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter. The gate, source, and drain of a FET and base, collector, and emitter of a BJT are terminals of the transistor.

References herein to a FET being "ON" or "enabled" means that the conduction channel of the FET is present and drain current may flow through the FET. References herein to a FET being "OFF" or "disabled" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. A display system, comprising:
a display panel;
a plurality of light emitting diodes (LEDs) arranged with respect to the display panel to illuminate the display panel; and
a voltage control circuit having an output;
a first current control circuit having a first current control circuit input coupled to the output of the voltage control circuit, having a second current control circuit input, and having a first current control circuit output coupled to at least one of the LEDs;
a second current control circuit having a third current control circuit input coupled to the output of the voltage control circuit and having a fourth current control circuit input, and having a second current control circuit output coupled to the least one of the LEDs; and
a current balance circuit having a first current balance circuit output and a second current balance circuit output, the first current balance circuit output coupled to the second current control circuit input, and the second current balance circuit output coupled to the fourth current control circuit input, the current balance circuit configurable to generate a first current at the first current balance circuit output and a second current at the second current balance circuit output, the first and second currents based on a difference between a first average current of the first current control circuit and a second average current of the second current control circuit.

2. The display system of claim 1, wherein:
the first current control circuit is configurable to adjust a first reference current based on a current from the output of the voltage control circuit and the first current; and
the second current control circuit is configurable to adjust a second reference current based on the current from the output of the voltage control circuit and the second current.

3. The display system of claim 2, wherein:
the first current control circuit is configurable to generate the first reference current by summing the current from the output of the voltage control circuit and the first current; and
the second current control circuit is configurable to generate the second reference current by summing the current from the output of the voltage control circuit and the second current.

4. The display system of claim 1, wherein the current balance circuit includes:

a first low-pass filter having a first low-pass filter output and configurable to low-pass filter a first current sense signal to produce a first filtered signal at the first low-pass filter output;

a second low-pass filter having a second low-pass filter output and configurable to low-pass filter a second current sense signal to produce a second filtered signal at the second low-pass filter output; and a first amplifier having a first amplifier input coupled to the first low-pass filter output and having a second amplifier input coupled to the second low-pass filter output.

5. The display system of claim 4, wherein the first current control circuit includes a first transistor, the second current control circuit includes a second transistor, and wherein:

the first low-pass filter is configurable to be disabled during a first blanking period following the first transistor turning on; and the second low-pass filter is configurable to be disabled during a third blanking period following the second transistor turning on.

6. The display system of claim 4, wherein the first current control circuit includes a first transistor, the second current control circuit includes a second transistor, and wherein:

the first low-pass filter is configurable to be disabled during a first blanking period following the first transistor turning on, a second blanking period following the second transistor turning off, and a third blanking period following the second transistor turning on; and the second low-pass filter is configurable to be disabled during a fourth blanking period following the second transistor turning on, a fifth blanking period following the first transistor turning off, and a sixth blanking period following the first transistor turning on.

7. The display system of claim 4, wherein:

the first low-pass filter includes a first resistor coupled to a first capacitor; and the second low-pass filter includes a second resistor coupled to a second capacitor.

8. The display system of claim 4, wherein the first amplifier has a first amplifier output, and the display system further includes:

a switch having a first switch terminal coupled to the first amplifier output and having a second switch terminal;

a second amplifier having a second amplifier input coupled to the second switch terminal and having a third amplifier input;

a reference voltage circuit coupled to the third amplifier input; and a capacitor having a capacitor terminal coupled to the second switch terminal.

9. An apparatus, comprising:

a voltage control circuit having an output;

a first current control circuit having a first current control circuit input coupled to the output of the voltage control circuit, having a second current control circuit input;

a second current control circuit having a third current control circuit input coupled to the output of the voltage control circuit and having a fourth current control circuit input; and a current balance circuit having a first current balance circuit output and a second current balance circuit output, the first current balance circuit output coupled to the second current control circuit input, and the second current balance circuit output coupled to the fourth current control circuit input, the current balance circuit configurable to generate a first current at the first current balance circuit output and a second current at the second current balance circuit output, the first and second currents based on a difference between a first average current of the first current control circuit and a second average current of the second current control circuit.

10. The apparatus of claim 9, wherein:

the first current control circuit is configurable to adjust a first reference current based on a current from the output of the voltage control circuit and the first current; and the second current control circuit is configurable to adjust a second reference current based on the current from the output of the voltage control circuit and the second current.

11. The apparatus of claim 10, wherein:

the first current control circuit is configurable to generate the first reference current by summing the current from the output of the voltage control circuit and the first current; and the second current control circuit is configurable to generate the second reference current by summing the current from the output of the voltage control circuit and the second current.

12. The apparatus of claim 9, wherein the current balance circuit includes:

a first low-pass filter having a first low-pass filter output and configurable to low-pass filter a first current sense signal to produce a first filtered signal at the first low-pass filter output;

a second low-pass filter having a second low-pass filter output and configurable to low-pass filter a second current sense signal to produce a second filtered signal at the second low-pass filter output; and a first amplifier having a first amplifier input coupled to the first low-pass filter output and having a second amplifier input coupled to the second low-pass filter output.

13. The apparatus of claim 12, wherein the first current control circuit includes a first transistor, the second current control circuit includes a second transistor, and wherein:

the first low-pass filter is configurable to be disabled during a first blanking period following the first transistor turning on; and the second low-pass filter is configurable to be disabled during a third blanking period following the second transistor turning on.

14. The apparatus of claim 12, wherein the first current control circuit includes a first transistor, the second current control circuit includes a second transistor, and wherein:

the first low-pass filter is configurable to be disabled during a first blanking period following the first transistor turning on, a second blanking period following the second transistor turning off, and a third blanking period following the second transistor turning on; and the second low-pass filter is configurable to be disabled during a fourth blanking period following the second transistor turning on, a fifth blanking period following the first transistor turning off, and a sixth blanking period following the first transistor turning on.

15. The apparatus of claim 12, wherein:

the first low-pass filter includes a first resistor coupled to a first capacitor; and the second low-pass filter includes a second resistor coupled to a second capacitor.

16. The apparatus of claim 12, wherein the first amplifier has a first amplifier output, and the apparatus further includes:

a switch having a first switch terminal coupled to the first amplifier output and having a second switch terminal;

a second amplifier having a second amplifier input coupled to the second switch terminal and having a third amplifier input;

a reference voltage circuit coupled to the third amplifier input; and a capacitor having a capacitor terminal coupled to the second switch terminal.

17. An apparatus, comprising:

a first current control circuit having a first transistor, the first current control circuit having a first clock input, a first error current input, a first current balance input, and a first output, the first current control circuit configurable to combine a first error current from the first error current input with a first balance current from the first current balance input to produce a first reference current, and to change a state of the first transistor in response to a first current through the first transistor reaching the first reference current;

a second current control circuit having a second transistor, the second current control circuit having a second clock input, a second error current input, a second current balance input, and a second output, the second current control circuit configurable to combine a second error current from the second error current input with a second balance current from the second current balance input to produce a second reference current, and to change a state of the second transistor in response to a second current through the second transistor reaching the second reference current; and a current balance circuit having a first input, a second input, a first current output, and a second current output, the first input coupled to the first output, the second input coupled to the second output, the first current output coupled to the first current balance input, and the second current output coupled to the second current balance input, the current balance circuit configurable to produce the first balance current at the first current output and the second balance current at the second current output in response to a difference between the first current and the second current.

18. The apparatus of claim 17, wherein the current balance circuit is configurable to produce the first balance current and the second balance current in response to the difference between an average of the first current and an average of the second current.

19. The apparatus of claim 17, wherein:

the first current control circuit configurable to combine the first error current with the first balance current by summing the first error current with the first balance current; and the second current control circuit configurable to combine the second error current with the second balance current by summing the second error current with the second balance current.

20. The apparatus of claim 17, wherein the current balance circuit includes a first amplifier configurable to produce a first signal at an output of the first amplifier, the first signal indicative of the difference between the first current and the second current, the first current control circuit also including a first capacitor coupled to the output of the first amplifier through a first switch, the first capacitor configurable to retain a voltage from the output of the first amplifier in response to the first switch being closed.

* * * * *